United States Patent
Bruce et al.

(10) Patent No.: US 8,625,751 B2
(45) Date of Patent: *Jan. 7, 2014

(54) SYSTEM AND METHOD OF AUDIBLE CALLER IDENTIFICATION VIA A MULTIMEDIA DEVICE

(75) Inventors: Les Bruce, Chicago, IL (US); Jeffrey L. Brandt, Cedar Park, TX (US); Marc A. Sullivan, Austin, TX (US); Mark B. Hubscher, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/186,876

(22) Filed: Jul. 20, 2011

(65) Prior Publication Data

US 2011/0274255 A1    Nov. 10, 2011

Related U.S. Application Data

(63) Continuation of application No. 11/590,649, filed on Oct. 31, 200, now Pat. No. 8,009,812.

(51) Int. Cl.
*H04M 11/00*    (2006.01)

(52) U.S. Cl.
USPC .................................. 379/88.13; 379/142.06

(58) Field of Classification Search
USPC .............................. 379/88.13–88.14, 142.06
See application file for complete search history.

(56) References Cited

U.S. PATENT DOCUMENTS

| | | | |
|---|---|---|---|
| 4,899,358 A | 2/1990 | Blakley | |
| 5,805,677 A * | 9/1998 | Ferry et al. | 379/93.35 |
| 5,875,232 A * | 2/1999 | Wolf | 379/88.19 |
| 5,875,239 A * | 2/1999 | Koralewski et al. | 379/142.15 |
| 5,907,604 A | 5/1999 | Hsu | |
| 6,038,443 A | 3/2000 | Luneau | |
| 6,154,531 A | 11/2000 | Clapper | |
| 6,178,232 B1 | 1/2001 | Latter et al. | |
| 6,233,325 B1 | 5/2001 | Frech et al. | |
| 6,292,210 B1 | 9/2001 | Gerszberg et al. | |
| 6,493,020 B1 | 12/2002 | Stevenson et al. | |
| 6,535,594 B1 | 3/2003 | Reeves-Nobles et al. | |
| 6,735,295 B1 | 5/2004 | Brennan et al. | |
| 6,738,615 B1 | 5/2004 | Chow et al. | |

(Continued)

FOREIGN PATENT DOCUMENTS

| | | |
|---|---|---|
| EP | 1505814 | 2/2005 |
| EP | 1739936 | 1/2007 |
| WO | 2006038586 | 4/2006 |

OTHER PUBLICATIONS

International Search Report and Written Opinion for International Patent No. PCT/US2007/018835, mailed on Dec. 14, 2007.

(Continued)

*Primary Examiner* — Simon Sing

(74) *Attorney, Agent, or Firm* — Toler Law Group, PC

(57) ABSTRACT

A method is disclosed that receives an incoming call at an electronic device, where the incoming call includes caller identification information. Further, the method determines whether a personal address book stored remotely from the electronic device includes an entry associated with the caller identification information. Additionally, an audio alert associated with the entry is inserted into a multimedia data stream, where the audio alert is determined based at least in part on the entry.

20 Claims, 9 Drawing Sheets

(56) References Cited

U.S. PATENT DOCUMENTS

| | | | |
|---|---|---|---|
| 6,816,469 B1 | 11/2004 | Kung et al. | |
| 7,039,698 B2 | 5/2006 | Slemmer et al. | |
| 7,075,919 B1 | 7/2006 | Wendt et al. | |
| 7,103,167 B2 | 9/2006 | Brahm et al. | |
| 7,113,586 B2 | 9/2006 | Silver | |
| 7,388,949 B2 | 6/2008 | Contractor et al. | |
| 7,421,067 B2 * | 9/2008 | Dewing et al. | 379/88.12 |
| 7,904,067 B1 * | 3/2011 | Tiwari et al. | 455/415 |
| 8,068,591 B2 * | 11/2011 | Soo et al. | 379/142.01 |
| 2002/0171552 A1 | 11/2002 | Tate | |
| 2002/0181694 A1 | 12/2002 | Mani | |
| 2002/0184346 A1 | 12/2002 | Mani | |
| 2003/0190024 A1 | 10/2003 | Ju | |
| 2005/0010573 A1 | 1/2005 | Garg | |
| 2005/0070261 A1 | 3/2005 | Belmont et al. | |
| 2007/0279247 A1 * | 12/2007 | Rye et al. | 340/825.72 |

OTHER PUBLICATIONS

Voice Announce Caller ID TD-CLVoice, www.harriscomm.com, Sep. 12, 2006.

* cited by examiner

SYSTEM AND METHOD OF AUDIBLE CALLER IDENTIFICATION VIA A MULTIMEDIA DEVICE

CLAIM OF PRIORITY

The present application is a continuation of and claims priority from U.S. patent application Ser. No. 11/590,649 filed on Oct. 31, 2006, the content of which is expressly incorporated herein by reference in its entirely.

FIELD OF THE DISCLOSURE

The present disclosure is generally related to systems and methods of audible caller identification via a multimedia device.

BACKGROUND

In general, caller identification devices are commercially available as assistive technologies for visually impaired individuals, for example, to provide an audible announcement of caller identification information. Such caller identification devices may be coupled to a telephone line to receive an incoming call and may include an audio output to produce an audible announcement of the caller identification information. However, such caller identification devices may not allow user customization. Additionally, such caller identification devices may be separate from other electronic devices that are already within a particular home. For example, if a user is focused on listening to an audio output of a particular electronic device, such as a television, the user may not hear an audio announcement of a caller identification provided by a separate caller identification device.

DETAILED DESCRIPTION OF THE DRAWINGS

In a particular illustrative embodiment, a method includes receiving an incoming call at an electronic device, where the incoming call includes caller identification information. The method further includes determining whether a personal address book stored remotely from the electronic device includes an entry associated with the caller identification information. Additionally, the method includes inserting an audio alert associated with the entry into a multimedia data stream, where the audio alert is determined based at least in part on the entry.

In another particular embodiment, an electronic device includes an input, a memory, and a processor. The input receives caller identification information associated with a telephone call. The memory is coupled to the input and stores processor executable instructions. The processor is coupled to the input and to the memory. The processor determines whether a personal address book stored remotely from the electronic device includes an entry associated with the caller identification information. Additionally, the processor inserts an audio alert associated with the entry into a multimedia data stream, where the audio alert is determined based on the entry.

In yet another particular embodiment, a non-transitory processor-readable medium including processor-executable instructions that, when executed by a processor, cause the processor to generate a graphical user interface. The graphical user interface is configured to enable a user associated with an electronic device to select a first personal address book stored remotely from the electronic device. A first audio alert associated with an entry of the first personal address book is inserted into a multimedia data stream that is received by the electronic device in response to an incoming call received at the electronic device.

Figure 1:
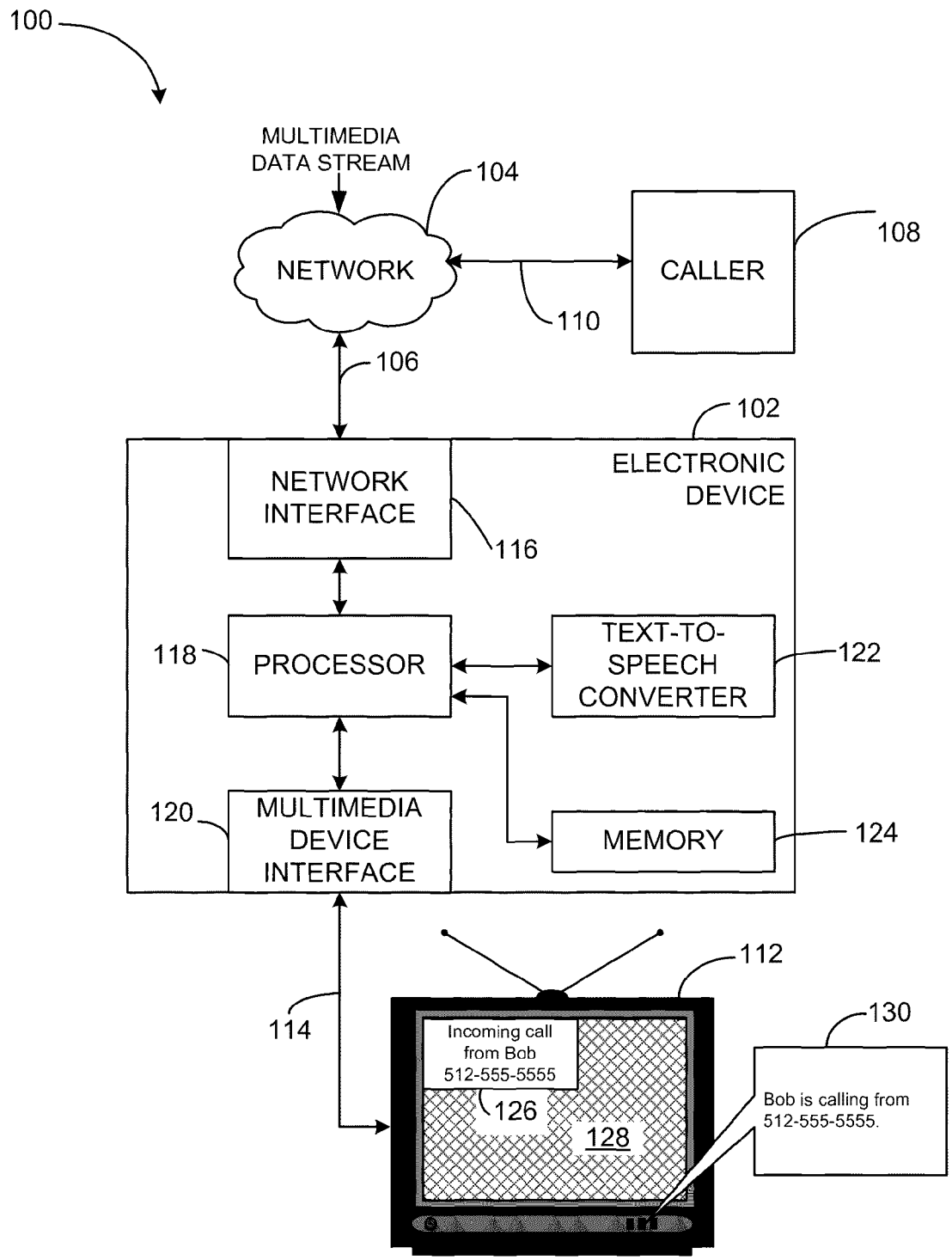
FIG. 1 is a block diagram of a particular illustrative embodiment of a system to provide an audio alert related to an incoming call with a multimedia data stream.

FIG. 1 is a block diagram of a particular embodiment of a system 100 to provide an audio alert related to an incoming call with a multimedia data stream. The system 100 includes an electronic device 102 coupled to a network 104 via a first communications link 106, which may include a digital subscriber line (DSL) or other broadband Internet connection (such as, for example, a Voice over Internet Protocol connection), a wireless connection, a plain old telephone service (POTS) connection, or another type of connection. The network 104 may receive an incoming call that is intended for a user associated with the electronic device 102. For example, the incoming call may be received from a caller 108 via a second communications link 110. In an illustrative embodiment, the second communications link 110 may be an Internet protocol link (such as a Voice over Internet Protocol connection), a wireless connection, a plain old telephone service (POTS) connection, or another type of connection. The network 104 may direct the incoming call from the caller 108 to the electronic device 102. The electronic device 102 includes a network interface 116, a processor 118, a multimedia device interface 120, a text-to-speech converter 122, and a memory 124. The electronic device 102 may be coupled to a multimedia device 112 via a communications link 114, which may be a cable link, a wireless link, or another type of communications link.

In a particular illustrative embodiment, the electronic device 102 may include a network interface 116 that is responsive to the network 104 to receive an incoming call including caller identification information, such as a name and a telephone number associated with the caller 108. The processor 118 may utilize the caller identification information to produce an audio alert via the text-to-speech converter 122. The processor 118 may insert the audio alert and the caller identification information into a multimedia data stream for audio playback and for display at the multimedia device 112. In a particular embodiment, the caller identification information may be displayed within a pop up window 126 within the display area 128 of the multimedia device 112. Additionally, the audio alert may be output as an audible sound 130 via speakers associated with the multimedia device 112. The speakers may be integral with or coupled to the multimedia device 112.

In another particular embodiment, a user may configure the electronic device 102 to store an audio alert in the memory 124. The user may associate the audio alert with a phone number associated with a particular caller, with a name of the particular caller, or with any combination thereof. In response to receiving an incoming call from the network 104, the processor 118 may search the memory 124 to identify an audio alert related to the caller identification information associated with the incoming call. If no match is found, the processor 118 may utilize the text-to-speech converter 122 to generate an audio alert based on the caller identification information. If a match is found, the processor 118 may insert the identified audio alert into the multimedia data stream along with caller information stored in the memory, such as information stored in a personal address book.

For example, in a particular illustrative embodiment, the caller 108 may be named Bob Smith. Caller identification information related to the caller 108 may be received from the network 104 (e.g. a caller name "Bob Smith" and a phone number "512-555-5555"). The processor 118 may receive the caller identification information from the network 104 via the network interface 116 and may search the memory 124 for stored caller information related to the caller identification information. If a match is identified but the caller information is not associated with an audio alert, the processor 118 may utilize the text-to-speech converter 122 to convert the identified caller information into an audio alert. For example, if the memory 124 includes a personal address book, a name or alias within the personal address book that is related to the caller identification information may be converted from text to speech to provide an audio alert. The processor 118 may then provide the audio alert to the multimedia device 112 for playback as an audible sound 130 via speakers associated with the multimedia device 112. In a particular embodiment, the processor 118 inserts the audio alert and at least a portion of the identified caller information into a multimedia data stream, which is transmitted to the multimedia device 112 via the multimedia device interface 120.

Figure 2:
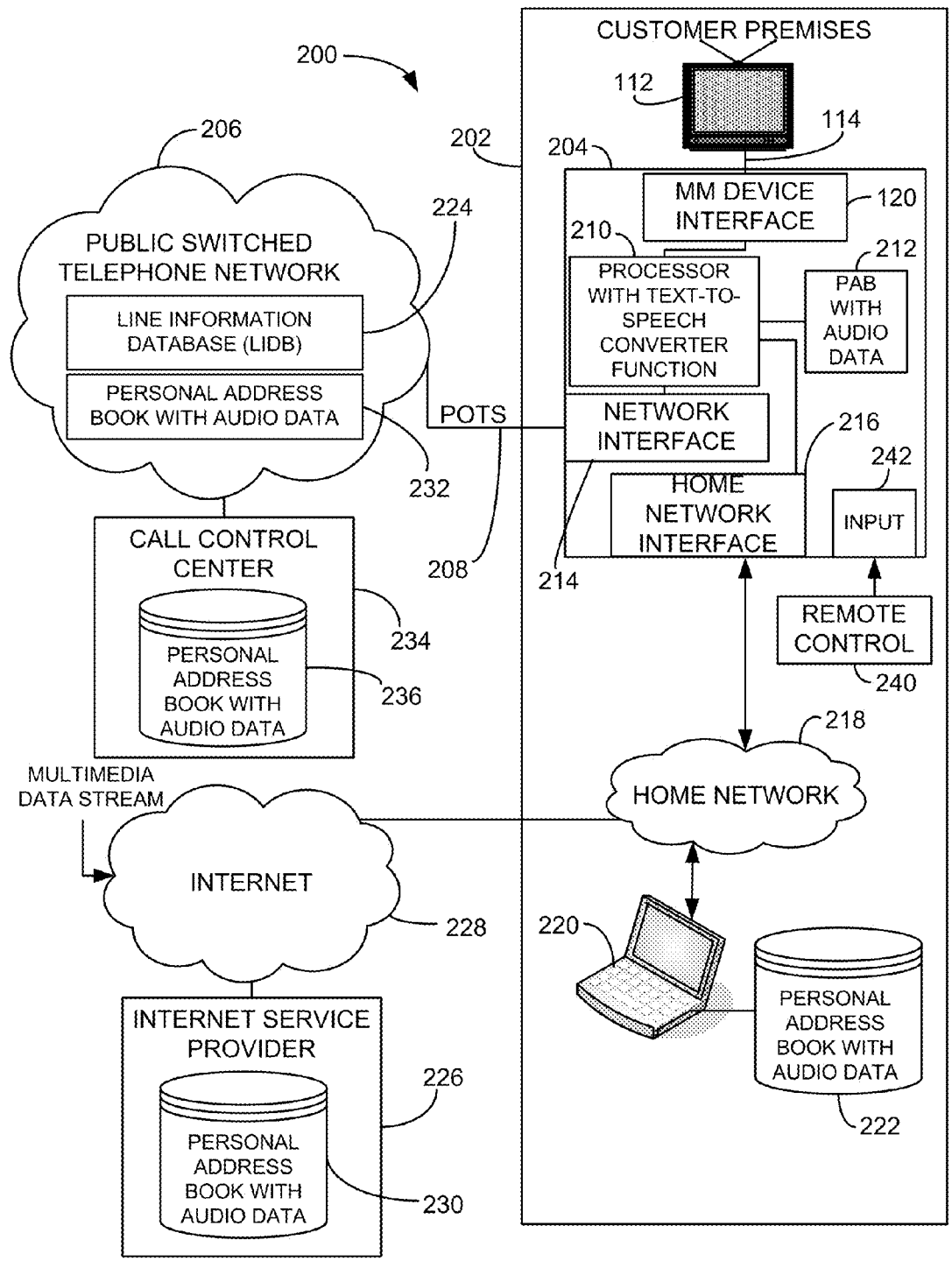
FIG. 2 is a block diagram of a second particular alternative illustrative embodiment of a system to provide an audio alert related to an incoming call with a multimedia data stream.

FIG. 2 is a block diagram of a second particular alternative embodiment of a system 200 to provide an audio alert related to an incoming call via a multimedia device. The system 200 includes a customer premises 202 having an electronic device 204, such as a set-top box device, which is coupled to a multimedia device 112 via a connection 114. In a particular embodiment, the electronic device 204 may be coupled to a public switched telephone network (PSTN) 206 via a communications link 208, such as a plain old telephone service (POTS) connection, a wireless communications link, or another type of communications link. The electronic device 204 may include a multimedia device interface 120, a processor with text-to-speech converter capability 210, a first personal address book (PAB) with audio data 212, a network interface 214, and a home network interface 216. The home network interface 216 may communicate with a computing device, such as a portable computer 220 via a home network 218. The portable computer 220 may include a second PAB with audio data 222. The home network 218 may be wired or wireless. The electronic device 204 may be coupled to a wide area network, such as the public Internet 228, via a dial-up connection, a wireless connection, or a broadband connection. The electronic device 204 may be adapted to communicate with an Internet service provider (ISP) 226 via the Internet 228 to access, for example, a third PAB with audio data 230.

In general, the PSTN 206 may include a line information database (LIDB) 224. In a particular illustrative embodiment, the PSTN 206 may also include a fourth PAB with audio data 232. Additionally, the PSTN 206 may be coupled to a call control center 234, which may include a fifth PAB with audio data 236.

A PAB with audio data may be stored in one or more different devices and at one or more locations, such as at a server of the PSTN 206 (e.g., the fourth PAB with audio data 232), at a server of the call control center 234 (e.g., the fifth PAB with audio data 236), at an Internet Service Provider 226 (e.g., the third PAB with audio data 230), at a computing device 220 coupled to the home network 218 (e.g., the second PAB with audio data 222), within the electronic device 204 (e.g., the first PAB with audio data 212), or any combination thereof. A user may configure the electronic device 204 to access the one or more PABs with audio data 212, 222, 230, 232, and 236 in a particular order via a user interface, such as the particular illustrative non-limiting embodiment of a user interface shown in FIG. 6.

In general, the PABs with audio data 212, 222, 230, 232, and 236 may each include one or more records, where each record includes a phone number and an associated alias or name. One or more of the records of the PABs with audio data 212, 222, 230, 232, and 236 may include an associated audio alert. For example, a user may configure the PAB with audio data 212 to associate a fog horn sound with a particular phone number, such that whenever an incoming call is received from the particular phone number, the fog horn sound plays as the audio alert on the multimedia display device. Alternatively, a user may configure the PAB with audio data 212 to associate a nickname with a particular phone number. The processor with text-to-speech capability 210 may convert the nickname and the associated phone number to produce the audio alert. In a particular embodiment, the PABs with audio data 212, 222, 230, 232, and 236 may include entries or records having audio alert data and entries or records that do not include audio data.

In a particular embodiment, a user may utilize the portable computer 220 to create a PAB with audio data 222 and/or to synchronize the PAB with audio data 222 with the PAB with audio data 212 of the electronic device 204. The processor with text-to-speech capability 210 may be configured by the user to retrieve data from at least one of the PABs with audio data 212, 222, 230, 232, and 236 in a particular order. In another embodiment, the processor 210 may be configured to provide a user interface responsive to a remote control device 240 associated with the electronic device 204 via an input 242, such as an infrared or other remote control interface.

In an exemplary embodiment, when a caller, such as the caller 108 in FIG. 1, dials a phone number associated with a user, the call is received by the PSTN 206, which uses the calling number of the caller to search the LIDB 224 to identify a billing name associated with the calling number. The PSTN 206 may include logic to provide the calling number or the calling number and a billing name to the electronic device 204 via the POTS connection 208. It should be understood that customers may subscribe to caller ID services from the PSTN 102 or they may choose not to subscribe. Additionally, there may be tiers within the caller ID services such as calling number only, billing name and calling number, and so on. The caller identification information provided by the PSTN 206 may be used by the processor with text-to-speech converter capability 210 to identify or to generate an audio alert associated with the caller identification information and to insert the audio alert into a multimedia data stream.

In a particular illustrative embodiment, the electronic device 204 may receive an incoming telephone call with caller identification information via the POTS connection 208. The electronic device 204 may determine if the PAB 212 includes a call entry related to the caller identification information. If the PAB 212 does not have a related entry, the electronic device 204 may search the PAB 222 via the home network 218. If no related entry is identified, the electronic device 204 may search one or more of the other PABs 230, 232 and 236. The particular search order may be configured by the user via a user interface.

In another particular illustrative embodiment, the electronic device 204 may receive an incoming telephone call with caller identification information via the POTS connection 208. The electronic device 204 may determine if the PAB 212 includes a call entry related to the caller identification information. If the PAB 212 does have a related entry, the electronic device 204 may determine if the related entry includes an audio alert. If no audio alert is found, the electronic device 204 may utilize the processor with text-to-speech converter function 210 to convert text from the related entry of the PAB 212 into speech to produce an audio alert, which may be sent to the display device 112 along with the text from the related entry to provide a visual pop up caller identification alert together with audible announcement (alert) associated with the incoming call. While this particular example describes conversion from text of the PAB 212 to produce an audio alert, it should be understood that the processor with text-to-speech converter function 210 may convert text from any of the PABs 212, 222, 230, 232, and 236 or from the caller identification information received with the incoming call to produce an audio alert.

In a particular illustrative embodiment, the processor with text-to-speech converter capability 210 may be adapted to adjust a volume level of the multimedia data stream, of the audio alert, or both, to create a volume differential between the multimedia data stream and the audio alert. In a particular embodiment, the audio alert may be played at a first volume level that is greater than a second volume level of the multimedia data stream. In another particular embodiment, the second volume level of the multimedia data stream may be reduced to a lower level and the first volume level of the audio alert may be played at a normal volume level.

Figure 3:
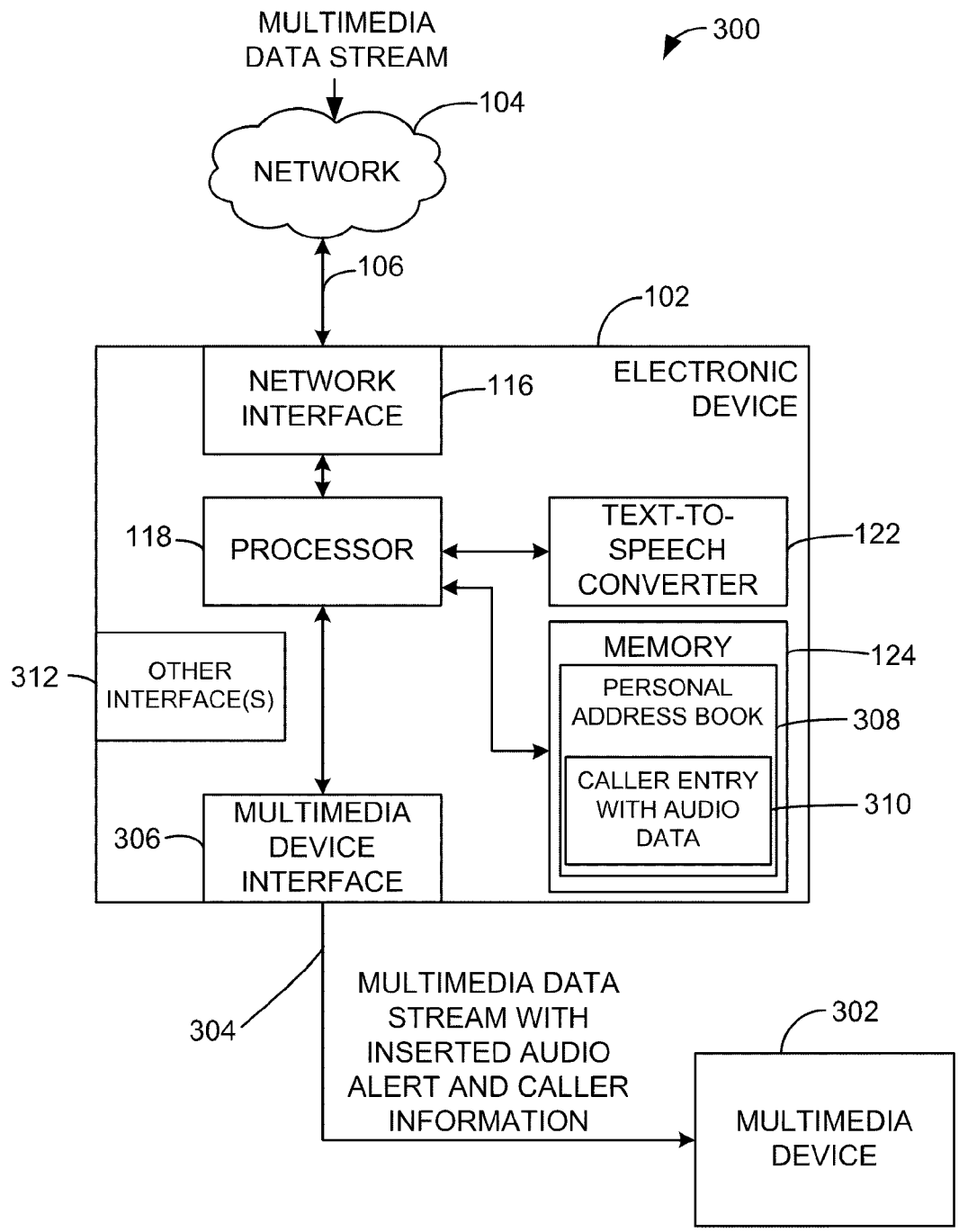
FIG. 3 is a block diagram of a third particular illustrative embodiment of a system to provide an audio alert related to an incoming call with a multimedia data stream.

FIG. 3 is a block diagram of a third particular embodiment of a system 300 to provide an audio alert associated with an incoming call. The system 300 may include an electronic device 102 that may be coupled to the network 104 via a network connection 106. The electronic device 102 may be coupled to a multimedia device 302 via a communication link 304. The electronic device 102 may include a network interface 116, a processor 118, a text-to-speech converter 122, and a memory 124, and a multimedia device interface 306. The memory 124 may include a personal address book (PAB) 308 including a caller entry with audio data 310. The electronic device 102 may also include other interfaces 312, such as a Universal Serial Bus (USB) interface, an infrared interface, a wired or wireless network interface, other types of interfaces, or any combination thereof. The other interfaces 312 may, for example, be utilized to receive user inputs.

In a particular embodiment, the electronic device 102 receives an incoming call including caller identification information from the network 104 via the communications link 106. The network interface 116 provides the caller identification information to the processor 118. The processor 118 may access the memory 124 to search the PAB 308 to identify a caller entry that is related to the caller identification information. If no caller entry is identified, the processor 118 may utilize the text-to-speech converter 122 to generate an audio alert based on the caller identification information. The processor 118 may provide the audio alert and at least a portion of the caller identification information to the multimedia device 302 via the multimedia device interface 306 and the communications link 304. In a particular embodiment, the processor 118 may insert the audio alert and the caller information into a multimedia data stream and may provide the multimedia data stream with the inserted audio alert and caller information to the multimedia device 302 via the communications link 304 and the multimedia device interface 306.

For example, the electronic device 102 may provide the audio alert to the multimedia device 302 for playback via a speaker associated with the multimedia device 302. Additionally, the multimedia device 302 may display the portion of the caller identification information in a pop up window, such as the pop up display 126 shown in FIG. 1. The pop up caller identification information may be displayed on top of video data being displayed, and the audible sound may be rendered at a volume level that is greater than the volume of the sound associated with the video data.

In a particular embodiment, the multimedia device may be a television, a portable computer (such as the portable computer 220 shown in FIG. 2), a handheld device (such as a personal digital assistant), or another device adapted to display video data and to reproduce audio data (either via speakers or via headphones).

Figure 4:
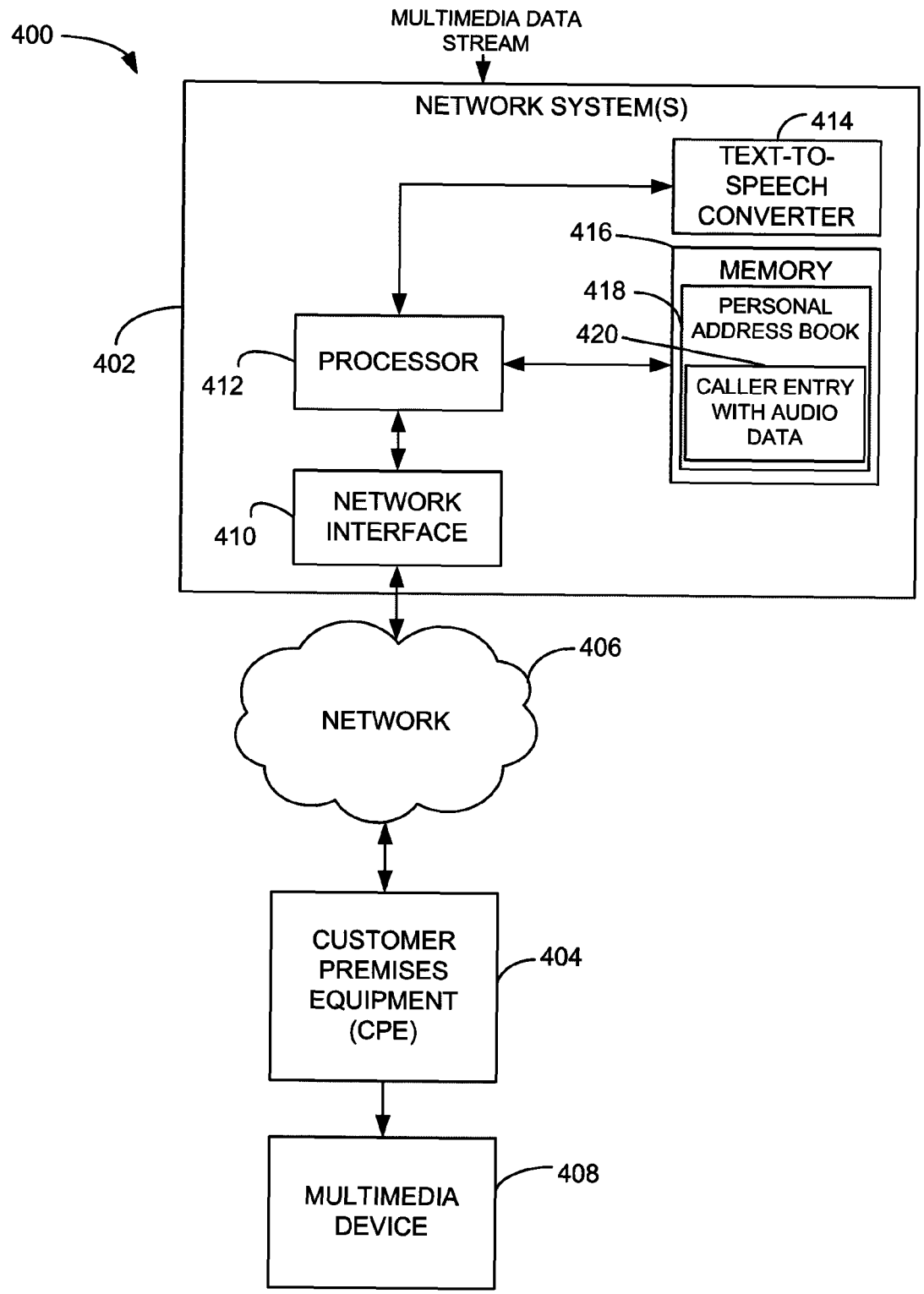
FIG. 4 is a block diagram of a particular illustrative embodiment of a network system to provide an audio alert related to an incoming call via customer premises equipment.

FIG. 4 is a block diagram of a particular embodiment of a system 400 to produce an audio alert related to an incoming call to customer premises equipment 404. The system 400 may include the network systems 402 coupled to the customer premises equipment (CPE) 404 via a network 406, which may be an Internet protocol network, a public switched telephone network, a wireless network, or another type of network. The CPE 404 may be coupled to a multimedia device 408 to display caller identification information and to playback an audio alert related to the caller identification information. The multimedia device 408 may be a computing device, such as a device including a video display and sound outputs (such as speakers or speaker connections), a television, or another device adapted to display video data and to reproduce audio data. The network systems 402 may include a network interface 410, a processor 412, a text-to-speech converter 414, and a memory 416. The memory 416 may include a personal address book 418 including a caller entry with audio data 420.

In a particular embodiment, the CPE 404 may receive an incoming call notification including caller identification information. The CPE 404 may transmit the caller identification information to the network systems 402 to request an audio alert. The network interface 410 may receive the caller identification information and may provide it to the processor 412.

In a particular embodiment, the processor 412 may convert the caller identification information into an audio alert via the text-to-speech converter 414 and may provide the generated audio alert to the CPE 404 for playback via the multimedia device 408. In another particular embodiment, the processor 412 may search the personal address book 418 to identify a particular caller entry that is related to the caller identification information. If no entry is identified, the processor 412 may convert the caller identification information into an audio alert using the text-to-speech converter 414. If an entry is identified but the identified entry does not include associated audio data, the processor 412 may convert information from the identified caller entry into an audio alert using the text-to-speech converter 414. If the identified entry includes associated audio data, the processor 412 may utilize the audio data as an audio alert. The processor 412 may then provide the audio alert to the CPE 404 for playback via a speaker of the multimedia device 408. In a particular illustrative embodiment, the processor 412 may also provide the caller information from the identified entry for display on the multimedia device 408.

Figure 5:
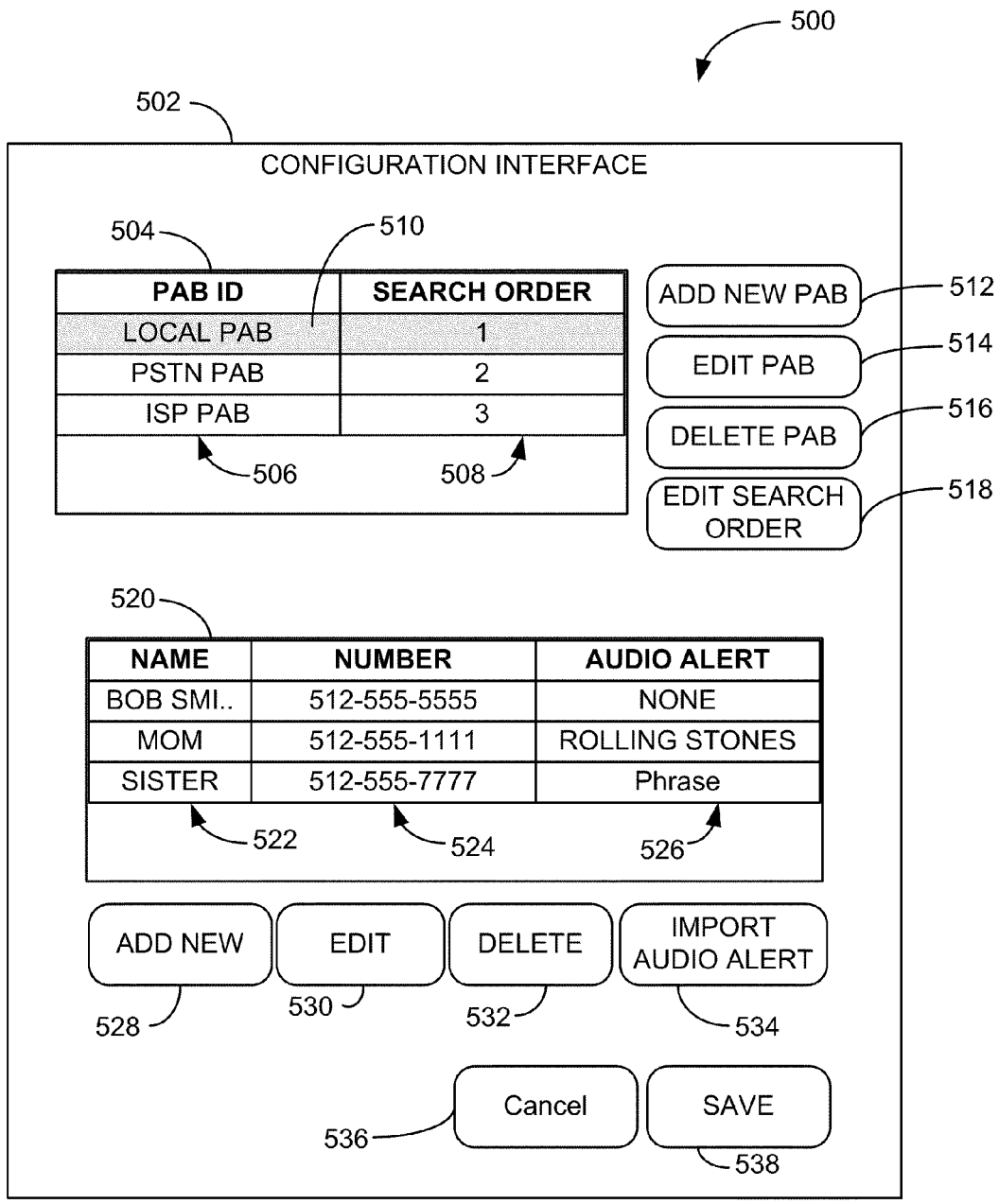
FIG. 5 is a block diagram of a particular illustrative embodiment of a user interface to receive user input to configure an electronic device to provide an audio alert.

FIG. 5 is a block diagram of a particular illustrative embodiment of a user interface 500 to configure an electronic device to provide an audio alert. The user interface 500 includes a graphical user interface window 502, which includes personal address book information 504. The personal address book information 504 includes a list of personal address books 506 and an associated search order list 508. The graphical user interface window 502 includes selectable indicators, including an add new personal address book (PAB) button 512, an edit PAB button 514, a delete PAB button 516, and an edit search order button 518. The local PAB identifier 510 of the list of PABs 506 is selected.

The graphical user interface window 502 can also include the caller information 520 associated with the selected local PAB 510. The caller information 520 includes a list of names 522, a list of associated phone numbers 524 and a list of associated audio alerts 526. The caller information 520 may include an add new entry button 528, an edit button 530, a delete button 532, and an import audio alert button 534. The graphical user interface window 502 may also include a cancel button 536 and a save button 538 to cancel or save any changes to a particular entry within a list.

In a particular embodiment, a user may add a personal address book to the list of personal address books 506 by selecting the add new button 512. A user may edit or delete a selected PAB, such as the selected PAB 510 by selecting the edit PAB button 514 or the delete PAB button 516. A user may change an order in which the processor searches one or more of the PABs by selecting the edit search order button 518.

In a particular embodiment, when the local PAB 510 is selected, the interface 500 displays the data contained in the selected PAB 510 in the caller information 520. A user may select an add new entry button 528 to add another name to the caller information list 522 and a number to the associated number list 524. A user may select an existing name within the list 522 and select the edit button 530 or the delete button 532 to edit or delete the caller entry. Additionally, a user may select the import audio alert button 534 to import or record an audio alert and to associate the imported or recorded audio alert with the selected caller entry in the list of names 522. Finally, a user may save any changes by selecting the save button 538 or cancel any changes by selecting the cancel button 536.

It should be understood that the user selectable buttons 512, 514, 516, 518, 528, 530, 532, 534, 536, and 538 may be presented as links, text items, icons, or another user selectable object. Additionally, the configuration interface may be arranged differently. For example, in a particular illustrative, non-limiting embodiment, the list of PABs 506 may be presented within a first window, and the list of names 522 may be presented in a second window when a user selects the edit PAB button 514.

Figure 6:
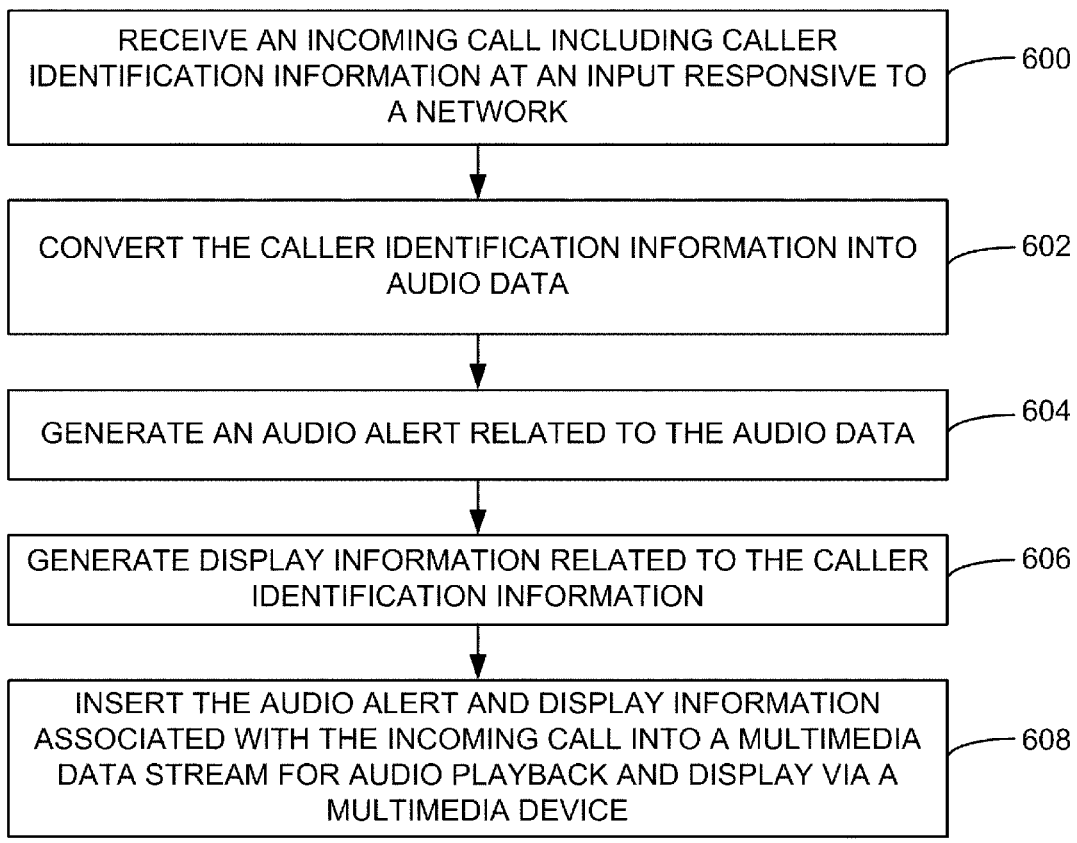
FIG. 6 is a flow diagram of a particular illustrative embodiment of a method of providing an audio alert related to an incoming call with a multimedia data stream for playback via a multimedia device.

FIG. 6 is a flow diagram of a particular illustrative embodiment of a method of providing an audio alert related to an incoming call via a multimedia device. An incoming call including caller identification information is received at an input responsive to a network, at 600. A text-to-speech converter converts the caller identification information into audio data, at 602. An audio alert is generated that is related to the audio data, at 604. Display information that is related to the caller identification information is generated, at 606. For example, a processor may include a portion of the caller identification information such as the phone number, and may insert, for example, a nickname or other information such as introductory language. In a particular embodiment, the processor may insert the caller identification information into the multimedia data stream, including an additional phrase, such as "The incoming call is from . . . " The audio alert and the display information associated with the incoming call are inserted into a multimedia data stream for audio playback and display via a multimedia device, at 608.

Figure 7:
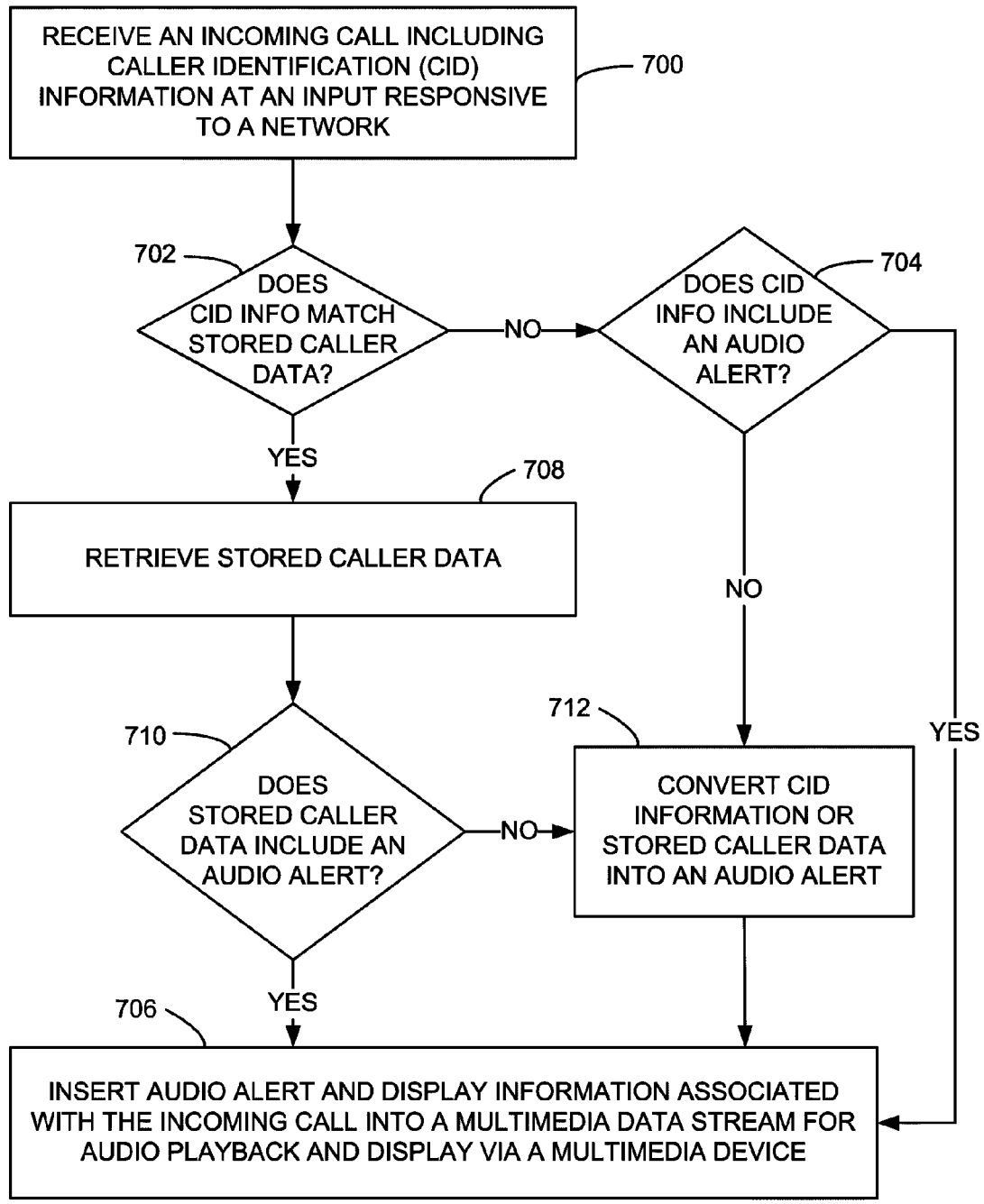
FIG. 7 is a flow diagram of a particular illustrative embodiment of a method of determining an audio alert associated with an incoming call.

FIG. 7 is a flow diagram of a particular illustrative embodiment of a method of determining an audio alert associated with an incoming call. An incoming call including caller identification (CID) information is received at an input responsive to a network, at 700. The system determines whether the CID information matches stored caller data, at 702. If the CID information does not match, the method advances to 704, and the system determines whether the CID information includes an audio alert. If the CID information includes an audio alert, the audio alert and display information associated with the incoming call are inserted into a multimedia data stream for audio playback and display via a multimedia device, at 706. If not, the method advances to 712, and the CID information is converted into an audio alert. The audio alert and display information associated with the incoming call are inserted into a multimedia data stream for audio playback and display via a multimedia device, at 706.

Returning to 702, if the CID information matches stored caller data, the processor retrieves the stored caller data, at 708. The processor determines whether the stored caller data includes an audio alert, at 710. If the stored caller data and the CID information do not include an audio alert, the method advances to 712, and the CID information or the stored caller is converted into an audio alert. The audio alert and display information associated with the incoming call are inserted into a multimedia data stream for audio playback and display via a multimedia device, at 706.

Figure 8:
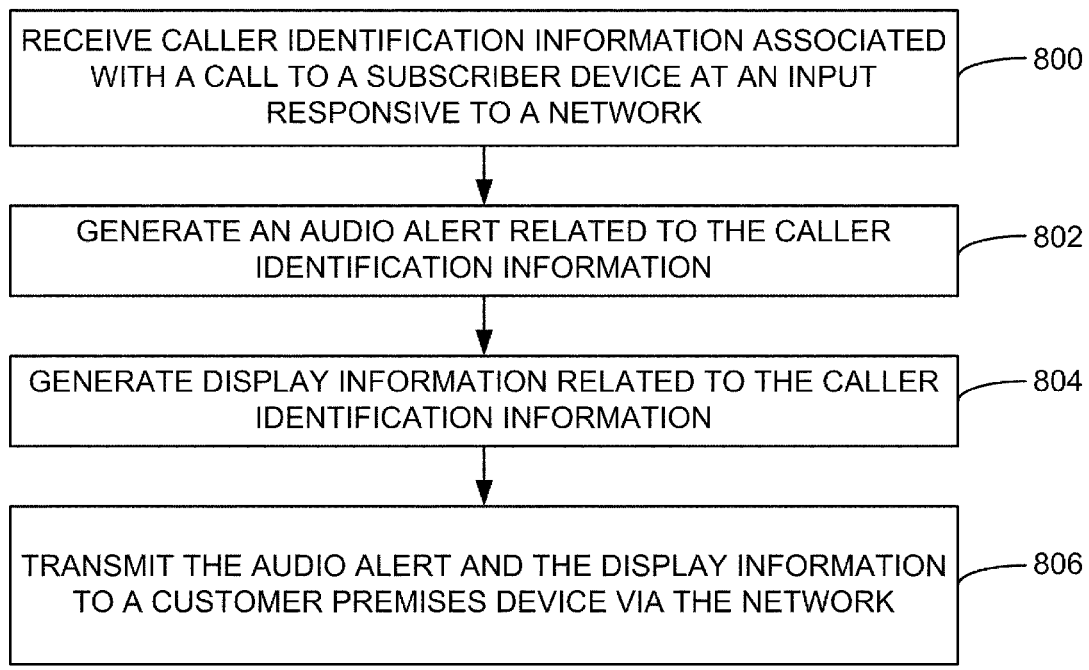
FIG. 8 is a flow diagram of a particular illustrative embodiment of a method of generating, at a network device, an audio alert related to an incoming call to customer premises equipment (CPE)

FIG. 8 is a flow diagram of a particular illustrative embodiment of a method of generating an audio alert at a network device. Caller identification information associated with a call to a user device is received at an input responsive to a network, at 800. An audio alert related to the caller identification information is generated, at 802. Display information related to the caller identification information is generated, at 804. The audio alert and the display information are transmitted to a user device via the network, at 806. In general, the user device may be an electronic device, such as the electronic device 102 shown in FIGS. 1 and 3, the electronic device 204 in FIG. 2, or the electronic device 404 in FIG. 4.

Figure 9:
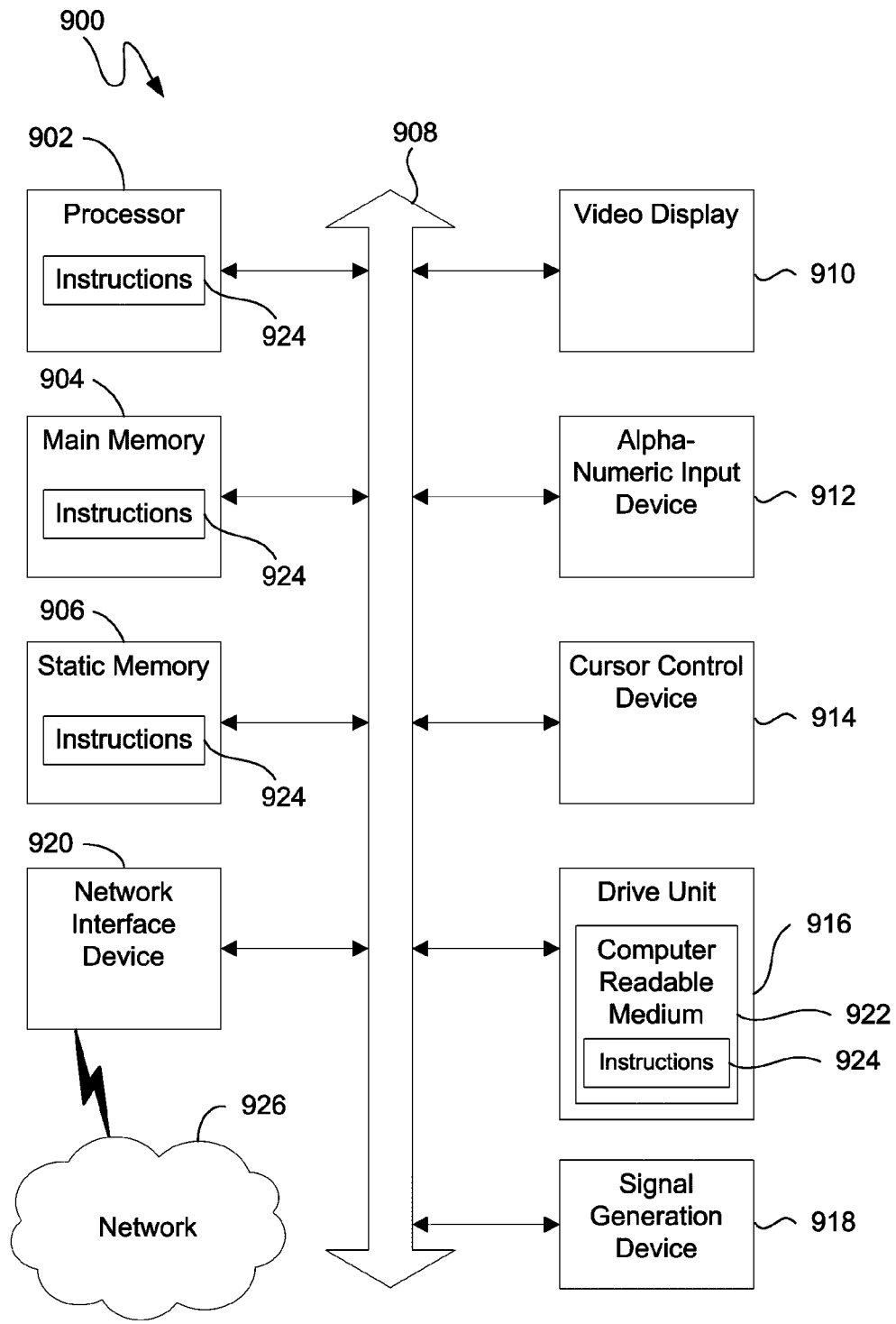
FIG. 9 is a block diagram that is representative of a general computer system that may be used to provide an audio alert related to an incoming call.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices, such as the multimedia devices, the portable computing devices, the networks, the servers, the network systems, and other devices illustrated in FIGS. 1-4.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g., software, can be embedded. Further, the instructions 924 may embody one or more of the methods or logic as described herein. Additionally, the instructions 924 may embody one or more user interfaces for configuring the methods and logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving an incoming call at an electronic device, wherein the incoming call includes caller identification information;
   determining whether a first personal address book stored remotely from the electronic device includes an entry associated with the caller identification information; and
   inserting a first audio alert associated with the entry into a multimedia data stream in response to a determination that the entry is included in the first personal address book, wherein the first audio alert is determined based at least in part on the entry, and wherein the first audio alert is generated by the electronic device in response to retrieving the entry.

2. The method of claim 1, further comprising generating the first audio alert based at least in part on caller information included in the entry.

3. The method of claim 1, further comprising accessing the first personal address book stored at a first device.

4. The method of claim 1, further comprising inserting display information associated with the entry into the multimedia data stream in response to the determination that the entry is included in the first personal address book.

5. The method of claim 1, further comprising generating a second audio alert based on at least a portion of the caller identification information.

6. The method of claim 5, wherein the second audio alert is generated in response to a determination that the personal address book does not include the entry associated with the caller identification information.

7. The method of claim 5, wherein the second audio alert is generated by the electronic device in response to retrieving the entry.

8. The method of claim 1, further comprising determining whether the first personal address book is accessible in response to the incoming call.

9. The method of claim 1, further comprising identifying the first personal address book based on a list of personal address books that defines an order of access of the personal address books.

10. The method of claim 9, further comprising accessing a second personal address book based on a determination that the first personal address book does not include the entry associated with the caller identification information, the second personal address book identified based on the list of personal address books and wherein the second personal address book follows the first personal address book in the order of access.

11. The method of claim 9, further comprising inserting a second audio alert based on at least a portion of the caller identification information into the multimedia data stream in response to a determination that each address book included in the list of personal address books is inaccessible.

12. An electronic device comprising:
   an input to receive caller identification information associated with a call;
   a memory coupled to the input, the memory to store processor executable instructions; and
   a processor coupled to the input and to the memory, the processor configured to execute the processor executable instructions to:
   determine whether a personal address book stored remotely from the electronic device includes an entry associated with the caller identification information; and
   insert an audio alert associated with the entry into a multimedia data stream, wherein the audio alert is determined based on the entry.

13. The electronic device of claim 12, further comprising receiving the audio alert at the electronic device via a network.

14. The electronic device of claim 13, wherein the network includes a wireless network.

15. The electronic device of claim 12, further comprising creating a volume differential between a first sound volume and a second sound volume, wherein the first sound volume is associated with the audio alert and the second sound volume is associated with the multimedia data stream.

16. The electronic device of claim 12, wherein the electronic device includes a set-top box.

17. The electronic device of claim 12, wherein the electronic device is located at a head end of a multimedia distribution system.

18. A non-transitory processor-readable medium comprising processor-executable instructions that, when executed by a processor, cause the processor to:
   generate a graphical user interface configured to enable a user associated with an electronic device to select a first personal address book stored remotely from the electronic device, wherein a first audio alert associated with an entry of the first personal address book is inserted into a multimedia data stream that is received by the electronic device in response to an incoming call received at the electronic device.

19. The non-transitory processor-readable medium of claim 18, wherein the graphical user interface is further configured to enable the user to define a list of personal address books and an order of access of the personal address books, wherein the list of personal address books includes the first personal address book.

20. The non-transitory processor-readable medium of claim 18, wherein the processor is included in the electronic device.

\* \* \* \* \*